May 31, 1966  J. JAMES  3,253,814
ADJUSTABLE SEAT STRUCTURE
Filed July 30, 1964  2 Sheets-Sheet 1
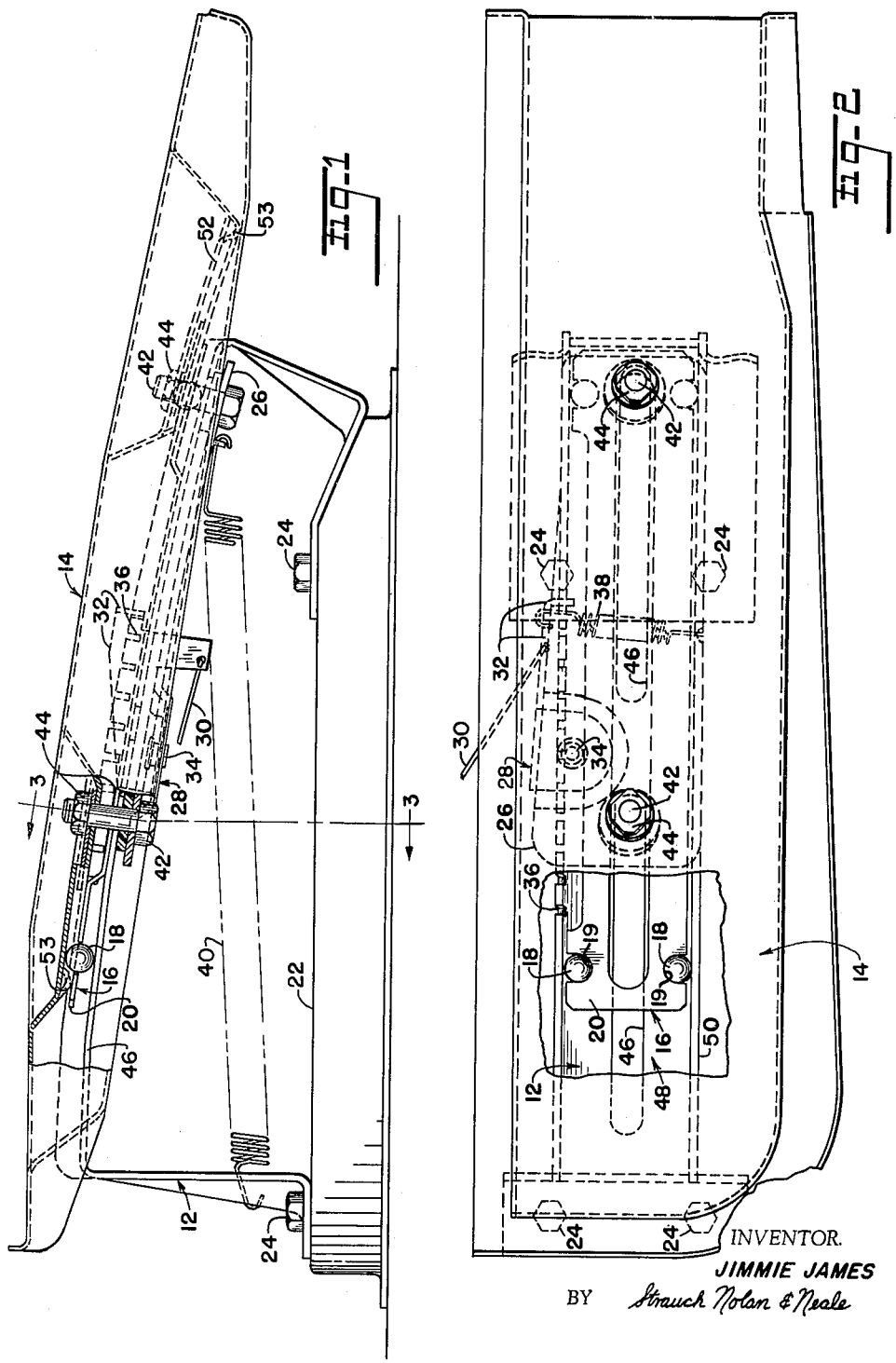
INVENTOR.
JIMMIE JAMES
BY *Strauch Nolan & Neale*

May 31, 1966  J. JAMES  3,253,814
ADJUSTABLE SEAT STRUCTURE
Filed July 30, 1964  2 Sheets-Sheet 2
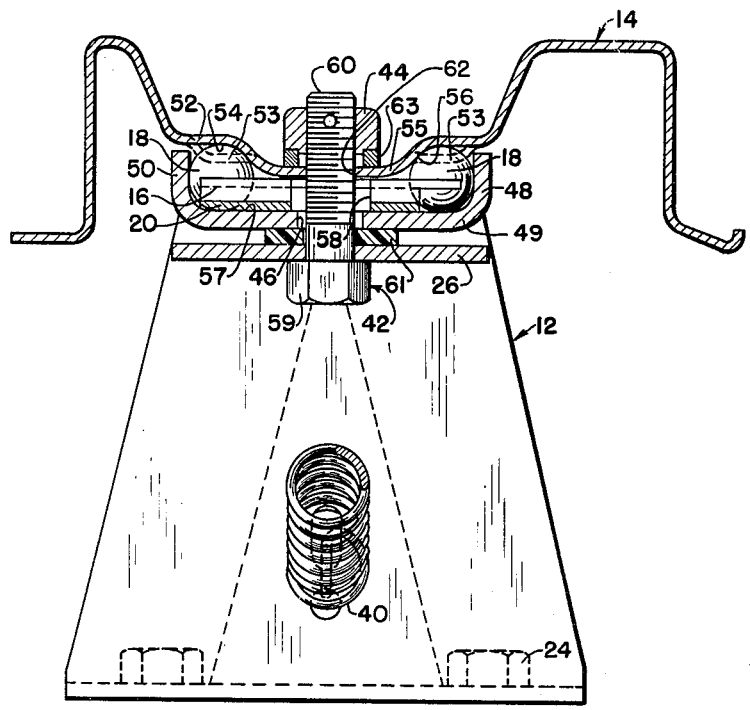
Fig-3
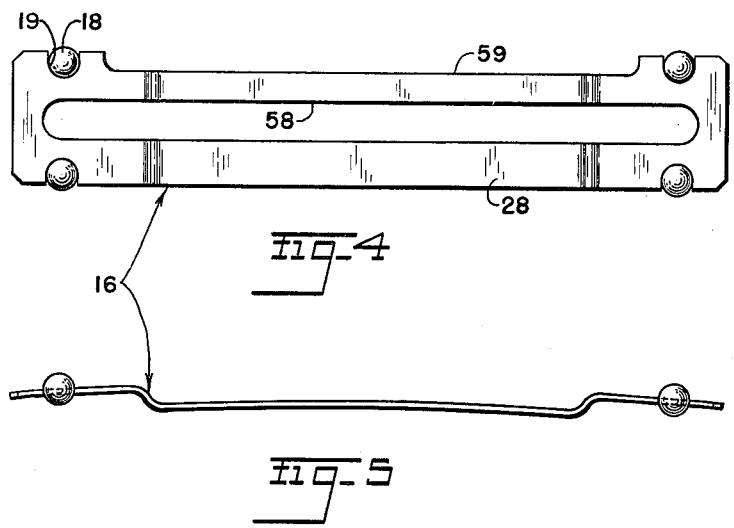
Fig-4
Fig-5
INVENTOR.
JIMMIE JAMES
BY *Strauch, Nolan & Neale*

United States Patent Office 3,253,814
Patented May 31, 1966

3,253,814
ADJUSTABLE SEAT STRUCTURE
Jimmie James, Madison Heights, Mich., assignor, by mesne assignments, to Rockwell-Standard Corporation, a corporation of Delaware
Filed July 30, 1964, Ser. No. 386,193
14 Claims. (Cl. 248—430)

The present invention refers to adjustable seat structures and more particularly to an improved slide track structure and associated bearing arrangements for fore and aft adjustment of such seats as automobile seats.

In adjustable seat structures, especially seating units for automobiles, it has been common to provide at each side of the unit slide tracks each comprising a lower stationary member fixed to the car floor and an upper seat mounting member adapted to slide forwardly or rearwardly upon the stationary member. Usually some kind of antifriction device such as ball or roller bearings is employed to assure easy movements of the slide mechanism. An adjustable seat structure of this type employing antifriction slide surfaces is disclosed in United States Letters Patent to James No. 3,037,736.

In most cases where ball and like bearings are used the bearing assemblies are loosely inserted relative to each other in complementary track channels formed by these upper and lower members. Stops are provided to limit movement of the bearings along the track channels in both directions. After prolonged operation of the slide mechanism these loose bearings generally tend to change from their initial positioning relative to each other so that when the seat is subsequently adjusted some of the bearing elements reach the limit stops prematurely thereby causing binding of the mechanism and preventing the bearings from rolling freely any longer. In such cases continued use of the slide mechanism causes excessive wear of the bearings and inner walls of the track channels and the mechanism operates harshly and noisily, if at all.

Another disadvantage in these prior art devices wherein the track members are usually made of sheet metal stampings in that frequent use of the slide mechanism with excessive force could misalign the tracks thereby causing hard and noisy operation, and the application of more force to overcome the binding effect often resulted in permanent damage to the sheet metal track members.

The present invention is intended to provide an improved seat slide mechanism which reduces and tends to eliminate the aforementioned disadvantages.

Accordingly it is the main object of the present invention to provide an improved seat slide structure embodying antifriction bearings, such as ball bearings, which are constantly retained in position relative to each other within track member channels to assure free rolling of the bearings relative to each other and hence of the slide mechanism at all times.

Another object of the invention resides in the provision of an improved seat slide track structure which employs an adjusting device to correct misalignment of bearings should there be deformation such as grooving of the tracks after repeated use.

Still a further object of the invention is to provide a seat slide structure employing caged ball bearings with adjustable slidable friction control members that can be set to increase or decrease friction between the bearings and inner track channel surfaces sufficient to maintain the tracks in desired efficient close rolling contact with the bearings and thereby prevent chatter and other noises during operation of the seat slide mechanism.

Other objects and novel features will become evident or will be specifically pointed out by the following description in connection with the appended drawings in which:

FIGURE 1 is a side elevation partly broken away and in section showing a seat slide assembly according to a preferred embodiment of the present invention;

FIGURE 2 is a top plan view partially broken away to show the lower member of the slide mechanism and the bearing retainer;

FIGURE 3 is a section taken substantially along line 3—3 of FIGURE 1 showing bearing retainer detail;

FIGURE 4 is a plan view of the bearing retainer; and

FIGURE 5 is a side view of the bearing retainer.

Similar reference numbers are applied to corresponding parts throughout all views.

FIGURES 1 and 2 illustrate the improved automobile seat sliding mechanism. There are two of these per seating unit, and only the left side is illustrated here. The right side is similar but laterally reversed.

The adjustable seat structure here comprises a stationary lower track member 12 and a slidable upper track member 14. These members are preferably sheet metal stampings and are shaped to house a bearing assembly 16 consisting essentially of four spherical ball bearings 18 contained in recesses 19 of a sheet metal bearing retainer 20.

This lower track member 12 is secured to the automobile floor 22 as by bolts 24. A reinforcing plate 26 for attachment of seat belts is adapted to move with upper track member 14 as will appear and is disposed along the underside of the track of member 12. A latch assembly 28 is operated by a latch release wire 30 leading to a centrally located manual release lever (not shown) which can be manipulated to operate in unison the two latch assemblies at opposite sides of the seating unit. The latch assembly comprises a tab 32 pivoted upon plate 26 at rivet 34 and adapted to be disengaged and engaged into any one of a series of latch notches 36 in lower member 12 thus providing for a plurality of seat adjustments by controlled displacement of member 14, fore and aft. A latch spring 38 connected between tab 32 and upper member 14 and a forward urging tension spring 40 connected between members 12 and 14 provide the necessary tension to engage latch tab 32 into a latch notch 36 once the latch release lever is released by the driver of the automobile upon completion of the adjustment of the seating unit. If desired the latch assembly and control may be like that of said James patent.

Lower track member 12, upper track member 14, reinforcing plate 26 and the attached latch assembly 28, and the bearing assembly 16 are fastened together in assembly by means of a special adjusting bolt 42 and weld nut assembly 44. There are two of these bolt and nut assemblies at each side, as shown in FIGURES 1 and 2. The detailed structure and functions of this adjusting bolt and nut assembly will be explained with reference to FIGURE 3. As shown best in FIGURE 2, two similar aligned longitudinal slots 46 are formed in lower track member 12 through which the adjusting bolts 42 at that side pass and they define the limits for fore or aft adjustment of the seating unit. The usual seat cushions of course extend between upper members 14.

FIGURE 3 is a detailed cross section of the track members and the associated adjusting bolt and weld nut structure. The lower track member 12 has along its upper end a generally U shaped cross-section shallow longitudinal channel 48 of uniform width extending throughout its horizontal length, the flat base 49 of the U being considerably wider than the height of the side flanges 50. The bearing assembly 16 seats on the base 49 within channel 48. Above the lower track member 12 and in opposition to channel 48 the upper track member 14, which has a generally M shaped cross-section over the slide mechanism area, is formed to provide two longitudinally spaced downwardly open channels 52 which are of the same width as channel 48 and extend over the front and rear ends of the bearing assembly 16.

As shown in FIGURES 1 and 2 the forward corners of forward channel 52 are formed with rounded protuberances 53 which provide limit stops for the forward pair of bearing balls 18, and the rearward corners of rear channel 52 are similarly formed with knobs or protuberances 53 providing limit stops for the rear pair of bearing balls 18. One function of these knobs is to prevent the ball bearings from rolling out from the track channels during assembly of the track members while the bearings are being phased into the bearing recesses 19 of the bearing retainer prior to final adjustment of the adjusting bolt 42 to provide proper friction between the bearings and track channel surfaces. A second function is to prevent the ball bearings from rolling out of phase with each other after assembly should grooves be cut into the inner track channel surfaces by repeated use of the slide mechanism until such time as the adjusting bolt 42 can be operated to again provide proper friction between the bearing and track channel surfaces.

The downwardly facing surface 54 of each channel 52 is flat and engages the tops of balls 18, and inwardly of the balls surface 54 is depressed to form a longitudinally extending rib 55. The sides of rib 55 merge laterally into surface 54 at smooth arcuate regions 56 having about the same curvature as the associated balls 18 and acting to help limit lateral inward displacement of the balls 18. The balls 18 rest on bottom surface 57 of channel 48 just inwardly of flanges 50. It will be noted that (FIGURES 1 and 5) the intermediate portion of retainer 20 rests on surface 57 while the two end portions of retainer 20 which engage the balls are displaced upwardly to diametrically embrace the balls.

The bearing assembly 16 is illustrated in FIGURES 4 and 5 and consists of four ball bearings 18 and a bearing retainer plate 20 of such width (FIGURE 2) as to lie along channel 48. The ball bearings 18 may be ordinary hard-surfaced antifriction bearings. The retainer plate 20 is a sheet metal stamping, slightly bowed, overall to conform to the general contour of the track channels, having a single central longitudinal slot 58 through which pass freely both adjusting bolts 42. A recess 59 is provided along the inside longitudinal edge to provide clearance for the latch assembly. Along the opposite longitudinal edges are the four ball bearing recesses 19 in which the ball bearings are contained in phase relative to each other. Each recess 19 is preferably of just slightly less depth than a diameter of ball 18. The bearing retainer thus constantly retains the ball bearings in the same position relative to each other within the track member channels at all times during operation thereby assuring the same even rolling of the ball bearings, and hence of the slide mechanism, at all times.

Referring again to FIGURE 3, each bolt 42 which extends through a suitable aperture in plate 26 comprises a head 59 engaging the underside of plate 26 and a threaded shank 60 projecting freely through slot 46 of the lower track member 12. A smooth friction washer 61, preferably of some hard tough plastic like nylon or Teflon, is disposed to surround the bolt between plate 26 and the bottom of channel 48. The threaded shank of bolt 42 extends freely through the bearing retainer slot 58 and through an aperture 62 in the upper track member 14 to enter nut 44. A nut 44 is welded to an apertured reinforcing plate 63, and the plate 63 is welded to member 14 above aperture 62, so that nut 44 provides a socket on the upper track member 14 threadedly receiving bolt 42.

The four ball bearings 18 of the bearing assembly 16 carry the load of member 14 and maintain the two track members 12 and 14 in fixed spatial relationship relative to each other with the bolts 42 being used to provide the proper frictional setting between the bearings and inner track channel surfaces, a setting which will hold the parts together but allow the bearings to slide and roll freely without chatter and other noises. The adjusting bolt 42 also serves to provide a continuing means of adjusting the track members and bearing assembly to compensate for deformation and grooving of the tracks should this occur after repeated and continued use of the sliding mechanism. Noise is reduced by the use of plastic slide washer 61 which eliminates metal-to-metal contact of reenforcing plate 26 with the lower track member. The bolt 42 is preferably of the type known as a Nylok bolt commonly used in industry and generally consisting of a metal bolt having some portion of its shank, threaded or unthreaded, inset with nylon or some other elastic material to provide increased friction between the mating bolt and nut surfaces, this tighter resilient fit acting in some part to eliminate subsequent loosening and hence noise during normal operation of the seat over a period of time.

In practice in assembly the bearing retainers 16 are laid in the channels 48 and the upper track members superposed over them to house the bearings. Plates 26 and washers 61 are positioned and then bolts 42 are thrust up from beneath into fixed nuts 44 and rotated until the desired degree of tightness is obtained in the assembly.

Now the upper track 14 may be controllably slidably moved over the lower track 12, with bolts 42 moving with the upper track along lower track slots 46. Plate 26 moves with the member 14 and washers 61 have smooth low friction sliding engagement with the undersurfaces of channel 48. The bearings 18 always are retained in the same relative positions during adjustment and operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An automobile or like seat structure comprising at each side a lower stationary member having an upwardly facing slide track, an upper member movably mounted on said lower member and formed with downwardly facing slide track, said slide tracks being substantially coextensive, a bearing and retainer assembly disposed directly between said tracks and comprising longitudinally spaced rolling bearing elements and spacer means maintaining said bearing elements in substantially the same position relative to each other longitudinally of said tracks during all relative adjusted positions of said members, and means for relatively adjusting said members and maintaining said adjustment.

2. An automobile or like seat structure comprising at each side an upstanding lower stationary member having an upwardly facing channel means, an upper member movably mounted on said lower member and formed with downwardly facing channel means, a bearing and retainer assembly disposed directly between and housed by said channel means and comprising longitudinally spaced roller bearing elements and a spacer for maintaining said elements in substantially the same relative position along said channel means during all adjusted positions of said upper member, and means for relatively adjusting said members and for maintaining said adjustment.

3. An automobile or like seat structure comprising at each side a stationary lower member having an upwardly open channel the base of which is formed with longitudinally aligned forward and rear slots, a movable upper member having an intermediate portion formed longitudinally to extend along said lower member and define therewith a bearing space, a caged roller bearing assembly disposed within said space for slidably mounting the upper member on said lower member and comprising forward and rearward roller bearings maintained in substantially constant longitudinal spacing, and adjustable fastener assemblies extending between said members at said slots.

4. An adjustable automobile or like seat structure comprising at each side a relatively stationary lower member, a seat supporting upper member mounted for adjustable forward and rearward movement on said lower member, coextensive forwardly and rearwardly extending bearing track means on said members, bearing means interposed between said track means for slidably supporting said upper member on said lower member and comprising forward and rearward roller bearings and spacer means maintaining said roller bearings in substantially the same relative position along said track means during all positions of adjustment of said upper member.

5. In the adjustable seat structure defined in claim 4, the track means on said lower member being a substantially continuous upwardly open channel, the track means on said upper member comprising two longitudinally aligned and spaced downwardly open channels, said forward and rearward roller bearings being disposed respectively between said lower channel and an associated one of said upper channels, and said spacer means comprising a member extending along said lower channel and having bearing retainer formations adjacent its opposite ends.

6. An automobile or like seat structure comprising at each side a stationary lower member having an upwardly open channel the base of which is formed with longitudinally aligned forward and rear slots, a movable upper member having an intermediate portion formed longitudinally to extend along said lower member and define therewith a bearing space, a caged roller bearing assembly comprising a slotted plate having ball bearing retainer recesses disposed within said space for slidably mounting the upper member on said lower member, and fastener assemblies projecting through said slotted plate extending between said members.

7. An automobile or like seat structure comprising at each side a stationary member having an upwardly open channel the base of which is formed with longitudinally aligned forward and rear slots, a movable upper member having an intermediate portion formed longitudinally to extend along said lower member and define therewith a bearing space, a caged roller bearing assembly disposed within said space for slidably mounting the upper member on said lower member, a reinforcing plate disposed below said channel, and fastener assemblies extending between said members at said slots, said fastener assemblies comprising bolts extending through said plate and said slots into threaded engagement with said upper member, whereby during forward and rearward seat adjustment said upper member, plate and bolts move together with respect to said lower member.

8. In the seat structure defined in claim 6, a bearing member of hard smooth plastic disposed between said plate and the bottom of said channel.

9. An automobile or like seat structure comprising at each side a lower stationary member having an upwardly facing longitudinally extending U-shaped track formed with a pair of longitudinally aligned slots, an upper movable member channeled on its lower surface above said track, two fasteners movable with said upper member extending through the respective slots, and a caged ball bearing assembly freely housed by said track and said channels for slidably supporting said upper member on said lower member.

10. In the seat structure defined in claim 9, said bearing assembly comprising a retainer bridging both of said fasteners and positioning bearing balls in fixedly spaced relation directly between said members.

11. In the seat structure defined in claim 10, said retainer being a slotted plate disposed within said track, and said fasteners extending freely through the slotted plate.

12. An automobile seat or like structure comprising at each side a lower stationary member having an upwardly facing U-shaped track formed with a pair of longitudinally aligned slots, an upper movable member formed on its lower surface with two longitudinally spaced channels extending above said track, a reenforcing plate disposed below said track, two fasteners movable with said upper member and plate extending through said slots, friction reducing elements disposed between said plate and said lower member, and a caged ball bearing assembly within said track below said channels for mounting ball bearings between each of said channels and said track in fixed spaced relation for slidably supporting said upper member on said lower member.

13. A vehicle seat assembly comprising stationary support means adapted to be secured to the floor of a vehicle, a seat frame adapted to mount seat cushions, means providing longitudinal slide bearing engagement between side members of said frame and said support means embodying a caged ball bearing assembly constituting the entire load bearing structure between said frame and said support means interposed therebetween, means for adjustably varying the bearing pressure between said bearing assembly and the associated surfaces of said frame and support means, and means for locking the seat frame in adjusted position on said support means.

14. A ball bearing assembly unit adapted to be mounted in a track between superposed relatively adjustable upper and lower automobile seat structure members comprising a unitary retainer plate having a longitudinally extending slot and on each side adjacent each end at least one outwardly open bearing ball retaining recess.

References Cited by the Examiner

UNITED STATES PATENTS 2,102,226 12/1937 Saunders et al. _____ 248—430
2,921,621 1/1960 Williams et al. ____ 248—430 X CLAUDE A. LE ROY, *Primary Examiner.*